(12) United States Patent
Fukushima et al.

(10) Patent No.: US 7,531,114 B2
(45) Date of Patent: May 12, 2009

(54) COMPOSITION IN GEL FORM COMPRISING CARBON NANOTUBE AND IONIC LIQUID AND METHOD FOR PRODUCTION THEREOF

(75) Inventors: Takanori Fukushima, Koto-ku (JP); Atsuko Ogawa, Yokohama (JP); Takuzo Aida, Bunkyo-ku (JP)

(73) Assignee: Japan Science and Technology Agency, Saitama (JP)

( * ) Notice: Subject to any disclaimer, the term of this patent is extended or adjusted under 35 U.S.C. 154(b) by 325 days.

(21) Appl. No.: 10/517,298

(22) PCT Filed: Oct. 15, 2003

(86) PCT No.: PCT/JP03/13162

§ 371 (c)(1),
(2), (4) Date: Dec. 7, 2004

(87) PCT Pub. No.: WO2004/037720

PCT Pub. Date: May 6, 2004

(65) Prior Publication Data

US 2005/0156144 A1    Jul. 21, 2005

(30) Foreign Application Priority Data

Oct. 23, 2002    (JP) .............................. 2002-307754

(51) Int. Cl.
*H01B 1/00* (2006.01)
*H01B 1/12* (2006.01)
*C01B 31/02* (2006.01)
*B05D 1/12* (2006.01)

(52) U.S. Cl. .................. 252/502; 252/62.2; 252/519.3; 252/500; 423/447.1; 423/447.3; 423/445 B; 428/323; 428/359; 428/408; 361/502; 361/503; 427/180; 264/299; 977/742; 977/750

(58) Field of Classification Search ................. 252/500, 252/502, 519.3; 428/378, 408; 423/447.1, 423/447.3; 977/750, 753; 429/213
See application file for complete search history.

(56) References Cited

U.S. PATENT DOCUMENTS 5,401,809 A * 3/1995 Gitzel et al. ................. 525/337

(Continued)

OTHER PUBLICATIONS

Fukushima et al, "Molecular Ordering of Organic Molten Salts Triggered by Single-Walled Carbon Nanotubes" Science, 3003, V300, pp. 2072-2074.*

(Continued)

*Primary Examiner*—Stanley Silverman
*Assistant Examiner*—Kallambella Vijayakumar
(74) *Attorney, Agent, or Firm*—Fay Sharpe LLP

(57) ABSTRACT

Disclosed is a novel technology, by which carbon nanotubes can be easily worked without degrading the characteristic properties thereof. A gel composition including a carbon nanotube and an ionic liquid is produced by pulverizing, in the presence of the ionic liquid, the carbon nanotube by applying a shearing force thereto, and then, if needed, subjecting the product of the pulverization to centrifugal separation. The gel composition exhibits an excellent workability and can be worked simply by forming a desired shape by subjecting the composition in a fluidized state to application of an external force by such an operation as a printing, coating, extrusion or injection operation, and then removing the ionic liquid with a solvent or an absorbent.

7 Claims, 4 Drawing Sheets

$EMIBF_4$ : R = $C_2H_5$, X = $BF_4$
$BMIBF_4$ : R = $n$-$C_4H_9$, X = $BF_4$
$HMIBF_4$ : R = $n$-$C_6H_{13}$, X = $BF_4$
$BMIPF_6$ : R = $n$-$C_4H_9$, X = $PF_6$
$BMITf_2N$: R = $n$-$C_4H_9$, X = $(CF_3SO_2)_2N$

U.S. PATENT DOCUMENTS

| | | | |
|---|---|---|---|
| 5,910,378 A * | 6/1999 | Debe et al. | 429/42 |
| 6,099,965 A * | 8/2000 | Tennent et al. | 428/408 |
| 6,110,619 A * | 8/2000 | Zhang et al. | 429/213 |
| 7,061,749 B2 * | 6/2006 | Liu et al. | 361/502 |
| 2002/0046872 A1 * | 4/2002 | Smalley et al. | 174/137 A |
| 2003/0077515 A1 * | 4/2003 | Chen et al. | 429/231.8 |
| 2005/0103706 A1 * | 5/2005 | Bennett et al. | 210/500.27 |
| 2006/0134326 A1 * | 6/2006 | Watanabe et al. | 427/180 |

OTHER PUBLICATIONS

Yeh et al, "Structure Studies of Poly(diallyldimethylammonium chloride-co-acrylamide gels/Sodium Dodecyl Sulfate Complex," Langmuir, 1998, 14, 4350-4358.*

Rooney et al , "Handbook of Solvents," Chem Tee Publishing, Ed. Wypech, 2001, ISBN 1-895198-24-0, 2001, pp. 1459-1471.*

Wasserschied, et al., *Ionic Liquid—New 'Solutions' for Transition Metal Catalysis, Angew. Chem. Int. Ed.* 2000, 39, 3772-3789, at p. 3773.

* cited by examiner

EMIBF$_4$ : R = C$_2$H$_5$, X = BF$_4$
BMIBF$_4$ : R = n-C$_4$H$_9$, X = BF$_4$
HMIBF$_4$ : R = n-C$_6$H$_{13}$, X = BF$_4$
BMIPF$_6$ : R = n-C$_4$H$_9$, X = PF$_6$
BMITf$_2$N: R = n-C$_4$H$_9$, X = (CF$_3$SO$_2$)$_2$N a b

COMPOSITION IN GEL FORM COMPRISING CARBON NANOTUBE AND IONIC LIQUID AND METHOD FOR PRODUCTION THEREOF

FIELD OF TECHNOLOGY

The present invention belongs to the field of molecular nanotechnology and, particularly relates to a novel material with a high workability derived from carbon nanotubes.

BACKGROUND ART

Carbon nanotubes have attracted considerable attentions as a leading material of the next generation, as they exhibit excellent electric properties diversely ranging from a metallic property to a semiconductive property, as well as a large surface area and a high mechanical strength. Thus, worldwide studies are being conducted on practical uses thereof in a variety of fields, as electrical or electronic materials, materials for reinforcing functional resins and the like.

However, carbon nanotubes are not present in the form of individual tubes separated from each other but are present in the form of large bundles, which causes poor workability and is hence a great barrier to the practicability of carbon nanotubes. Methods have been proposed for improving the workability, in which carbon nanotubes are subjected to a chemical treatment of the surfaces thereof so to give them improved dispersibility. However, it has been pointed out that the methods are problematical because the treatment degrades the intrinsic characteristic properties of carbon nanotubes.

The purpose of the present invention is to provide a novel technology, by which carbon nanotubes can be easily worked without damaging the characteristic properties thereof.

DISCLOSURE OF THE INVENTION

Through extensive studies to achieve the above-mentioned object, the present inventors found that the utilization of an ionic liquid results in compositions or composites having an extremely excellent workability or processability and accomplished the present invention based on this discovery.

Thus, according to the present invention, there is provided a gel composition comprising a carbon nanotube and an ionic liquid.

The present invention also provides a method for producing such gel composition comprising a carbon nanotube and an ionic liquid, which comprises a step of pulverizing, in the presence of the ionic liquid, the carbon nanotube by applying a shearing force thereto, and preferably a step of subjecting the product of the pulverization to centrifugal separation.

According to the present invention there is further provided a method for working the gel composition comprising a carbon nanotube and an ionic liquid, which comprises a step of forming a desired shape from said gel composition by subjecting the composition in a fluidized state to application of an external force by a printing, coating, extrusion or injection operation, and a step of removing the ionic liquid from said gel composition by bringing said shape in contact with a solvent capable of dissolving the ionic liquid or an absorbent capable of absorbing the ionic liquid.

BEST MODE FOR CARRYING OUT THE INVENTION

Figure 1:
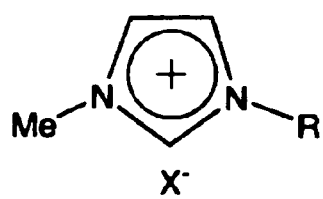
FIG. 1 shows chemical structures of examples of ionic liquids suitable for use in the present invention.

According to the present invention, there is provided a unique technology which enables, simply by physical operations, the preparation of a carbon nanotube-containing material (composition) having an extremely excellent workability, wherein three factors (a carbon nanotube (1) and an ionic liquid (2) are pulverized under a shearing force (3)) are indispensable and no gel compositions of the present invention can be produced in case that even one of the factors is not present.

More specifically: (1) A simple admixing of a carbon nanotube and an ionic liquid without applying a shearing force will not produce the gel composition. (2) Use of carbonaceous materials other than carbon nanotubes, such as graphite, $C_{60}$, and active carbon will not produce the gel composition. (3) Pulverization of a carbon nanotube under a shearing force using an ordinary organic solvent or an ionic liquid precursor, instead of an ionic liquid, will not produce the gel composition (cf. Comparative Examples set out later).

Thus, in producing a gel composition comprising a carbon nanotube and an ionic liquid in accordance with the present invention, the carbon nanotube is pulverized, in the presence of the ionic liquid, by applying a shearing force thereto in the first place.

The examples of means for applying a shearing force in the step of the pulverization include, but are not limited to, a manual or automatic grinding operation in a mortar, in the case of a small-scale production as in a laboratory, and the use of a wet milling machine with a high shearing force such as a ball mill, a roller mill or an oscillating mill, in the case of a mass production. A kneader type of device may also be used. While the time required for the pulverization step is not limited and varies depending upon the degree of the pulverization for the respective uses, it is generally about from five minutes to one hour.

Through the step as mentioned above, there is obtained a black, pasty product. While the black pasty product may be used as it is, as a composition of the present invention, in general it is preferably subjected to centrifugal separation. Thus, the surplus ionic liquid which was not involved in the formation of the gel composition is removed by the centrifugal separation.

Although the formation mechanism and structure of the gel composition comprising a carbon nanotube and an ionic liquid of the present invention have not yet been completely elucidated, a rough idea based on the results of various analyses is as follows (see the Working Examples set out later):

(1) The pulverization treatment under a shearing force will not cause a chemical change of carbon nanotubes but cause a physical configurational change in which the degree of entanglement among the individual carbon nanotubes is decreased so as to form thinner bundles.

(2) It is thought that the gel formation is not due to the entanglement of carbon nanotubes, but is caused by the formation of a crosslinked structure (three-dimensional network structure) in which the ionic liquid molecules, attached to the surfaces of the less entangled carbon nanotubes through the "cation-π" interaction, serve to combine the bundles of carbon nanotubes with one another through ionic bonding.

It is well known that an ionic liquid as used in the present invention is also referred to as a cold molten salt or simply as a molten salt, and is defined as a salt which assumes a molten state in a wide range of temperatures including ordinary temperature (room temperature).

While a variety of known ionic liquids can be used in the present invention, it is preferred to use an ionic liquid which is stable and assumes a molten state at ordinary temperature (room temperature) or at a temperature very near ordinary temperature. As ionic liquids suitable for use in the present invention there can be exemplified the ones composed of a cation selected from the general formulae (I) through (IV) given below (preferably a quaternary ammonium ion) and a anion ($X^-$).

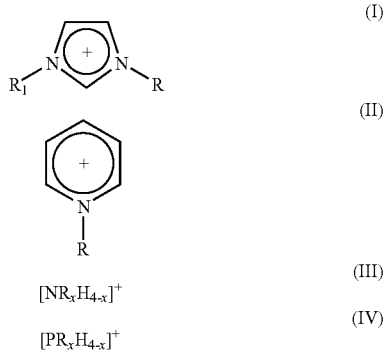

In formulae (I) through (IV), R represents an alkyl group having ten or less carbon atoms or an alkyl group containing an ether bond or bonds and having ten or less carbon atoms plus hydrogen atoms. In formula (I), $R^1$ represents an alkyl group having 1-4 carbon atoms or hydrogen atom, which is preferably methyl group having one carbon atom. In formula (I), it is preferred that R and $R^1$ are not the same. In formulae (III) and (IV), x is an integer of 1-4.

Examples of the anion ($X^-$) include at least one selected from among tetrafluoroborate, hexafluorophosphate, bis(trifluoromethylsulfonyl) imidate, perchlorate, tris(trifluoromethylsulfonyl) carbonate, trifluoromethanesulfonate, dicyanamide, trifluoroacetate, an organic carboxylate, and halogen ions.

As well known, a carbon nanotube, as used in the present invention, is a carbonaceous material of graphene sheet(s) rolled into a cylindrical form and carbon nanotubes can be divided broadly into single-walled carbon nanotubes (SWCNTs) and multi-walled carbon nanotubes (MWCNTs), depending upon the number of the surrounding walls, and also classified into chiral (spiral) type, zigzag type and armchair type, depending upon the structure of the grapheme sheet. Thus, a variety of carbon nanotubes are known. While the present invention can be applied to any type of the known carbon nanotubes, it is generally easy for a single-walled carbon nanotube, which has a high aspect ratio (i.e., is fine and long), to form a gel and the present invention is therefore suitable for producing a gel composition from a SWCNT. Examples of carbon nanotubes suitable for practical use include, but are not limited to, HiPco (commercially available from Carbon Nanotechnologies Co.,), which can be produced on a relatively large scale from carbon monoxide.

The ratio of a carbon nanotube and an ionic liquid can be determined by a simple test: A sufficient amount of the ionic liquid is used over the carbon nanotube, so that a clear ionic liquid is isolated when the black pasty product (the carbon nanotube+the ionic liquid) is subjected to the centrifugal separation step following the pulverization. While the ratio depends upon the types of carbon nanotubes and ionic liquids used, it is general that an ionic liquid is used in an amount of more than 100 times by weight over a carbon nanotube.

As the purity of carbon nanotube is low, the gel formation ability will fall. Thus, it is preferred to use a carbon nanotube which is purified as highly as possible from impurities such as the catalyst residue. While it is general that a carbon nanotube with a purity of about 70% or higher is preferably used owing to efficient gel formation, the purity of carbon nanotubes is optional, ranging from a high purity to a relatively low purity depending upon the application.

The gel composition of the present invention is a rare material composed of a fine dispersion of a carbon nanotube, and features nonvolatility, incombustibility and high thermal stability, which properties are derived from an ionic liquid.

The gel composition of the present invention, which comprises a carbon nanotube and an ionic liquid, is further characterized in that it assumes a fluid state when applied with an external force whereas it possesses a shape-retention ability as it is.

Thus, the gel composition of the present invention, taking advantage of such characteristic properties, can be subjected to a working process for shaping, which comprises a step of forming a desired shape [including planar (two-dimensional) ones such as dots, lines, letters or characters, patterns, figures, or fibrous materials, or stereoscopic (three-dimensional) products] by printing, coating, extruding or injecting the composition with an appropriate tool or device such as an injector, a jet-spray printer, a bar coater or a spray coater, and then a step of removing the ionic liquid from the shape produced. Removing the ionic liquid from the product with the desired shape is accomplished by bringing the product in contact with a solvent (such as water or an alcohol) capable of dissolving the ionic liquid (specifically, for example, the product is immersed in the solvent for extraction or the product is washed with the solvent), or by bringing the product in contact with an absorber (for example, a filter paper or fabric) capable of absorbing the ionic liquid. Thus, the product composed of a carbon nanotube retains its shape. Therefore, the gel composition of the present invention has a wide range of expected applications, including new types of carbon nanotube-containing materials such as painting materials, printing materials, coating materials, molding materials, electronic device materials provided with a semiconducting or metallic property, or micromedical device materials.

EXAMPLES

The features of the present invention will be explained more specifically with reference to the following examples, which are not for restricting the present invention.

Example 1

Preparation and use of Gel Composition

On pulverizing 1 part by weight of single-walled carbon nanotube (HiPco: available from Carbon Nanotechnologies Co., purity >95%) and 200 parts by weight of ionic liquid, 1-butyl-3-methyl imidazolium tetrafluoroborate ($BMIBF_4$:

cf FIG. 1), there was obtained a black, pasty product. The pasty product was subjected to centrifugation (9100 g, three hours) resulting in separation of a black gel composition containing the ionic liquid and approx. 1% by weight of the carbon nanotube (HiPco), from a clear solution of the ionic liquid. In the same manner, gel compositions were prepared by using other types of ionic liquids, i.e., 1-ethyl-3-methylimidazolium tetrafluoroborate ($EMIBF_4$), 1-hexyl-3-methylimidazolium tetrafluoroborate ($HMIBF_4$), 1-butyl-3-methylimidazolium bis (trifluoromethylsulfonyl) imide ($BMITf_2N$), and 1-butyl-3-methylimidazolium hexafluorophosphate ($BMIPF_6$) (cf. FIG. 1). In the case where $EMIBF_4$ or $HMIBF_4$ was used, there was obtained a gel composition containing approx. 1% by weight of the carbon nanotube, as in the case of $BMIBF_4$. In the case of $BMITf_2N$ or $BMIPF_6$, the gel formation was more efficient, and thus a gel composition was obtained with only approx. 0.5% by weight of the carbon nanotube (HiPco).

When each of the gel compositions was placed in an injector, it could be extruded therefrom in the form of a thread, with which a picture was drawn on a plate. On bringing the drawn picture in contact with a filter paper, the ionic liquid was absorbed into the filter paper while the black picture was stably retained.

Comparative Example

Use of Organic Solvents and Other Carbonaceous Materials

For comparison, in place of the above-mentioned ionic liquid, there was used dichlorobenzene, ethanol or N,N-demethylformamide (DMF), as a conventional organic solvent, or 1-methylimidazole, as a precursor of the ionic liquid, and the resultant mixture was subjected to pulverization, as in Example 1, in an automatic mortar under a high shearing force at room temperature for more than two hours. However, no gels were formed.

In the same manner as in Example 1 pulverization treatment under a high shearing force was also carried out, where there was used, as carbonaceous material, graphite (1-2 µm, Aldrich), active charcoal, or $C_{60}$ (purity:99.9%, TCI) in place of the carbon nanotube (HiPco). No gel formation was observed.

Example 2

Figure 2:
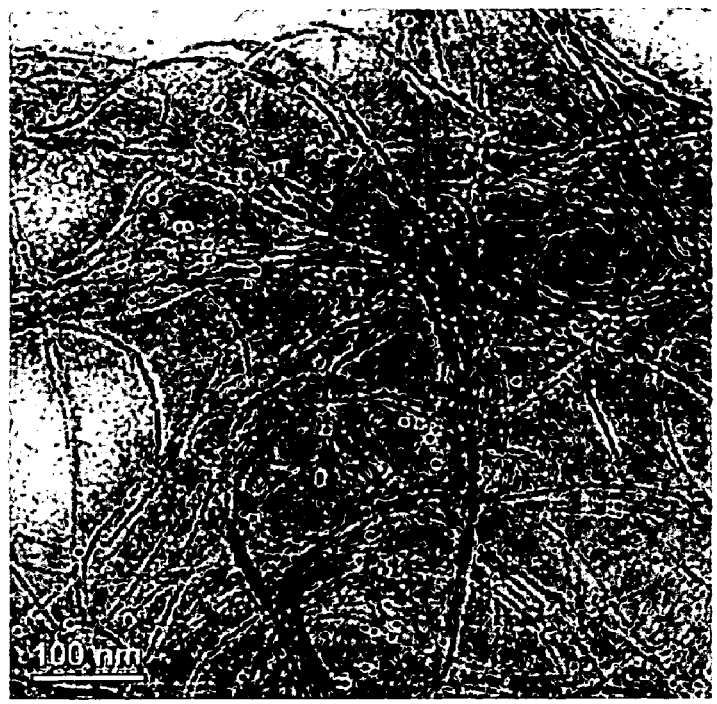
FIG. 2 shows a transmission electron microscopic (TEM) view of a gel composition of the present invention comprising a carbon nanotube and an ionic liquid (a) in comparison with a TEM view of the carbon nanotube prior to the formation of the gel composition (b).
Figure 2:
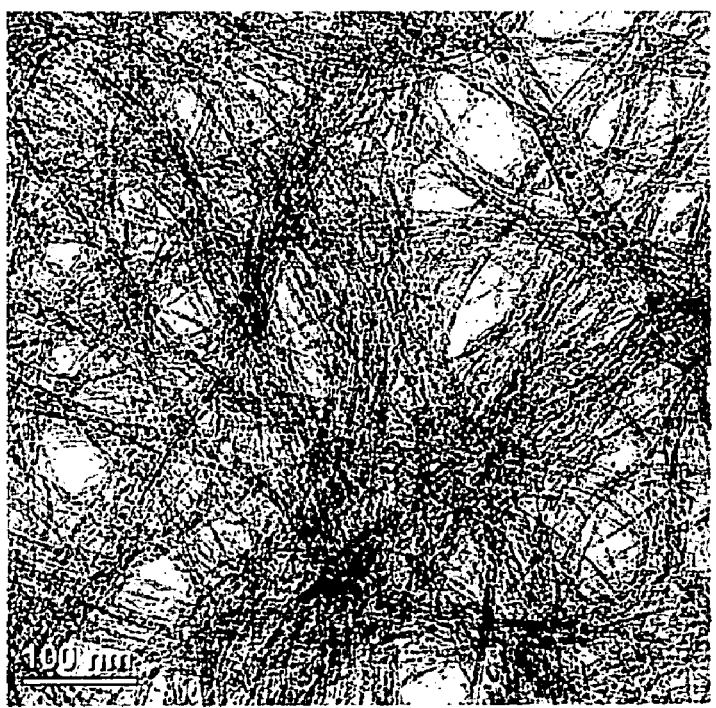

Structural Analysis of the Gel Composition (1) Electron Microscopic Observation and Optical Spectral Measurement:

FIG. 2a shows a TEM (transmission electron microscopy) view of the gel composition as prepared in Example 1 composed of a dispersion of carbon nanotube (HiPco) in deionized water (the ionic liquid: $BMIBF_4$) as prepared in Example 1. For comparison, FIG. 2b shows a TEM view of carbon nanotube (HiPco) having undergone only an ultrasonic treatment with ethanol and thus prior to the gel formation. It is seen that the pulverization treatment under the shearing force resulted in a decreased entanglement among the carbon nanotubes to form thinner bundles.

Figure 3:
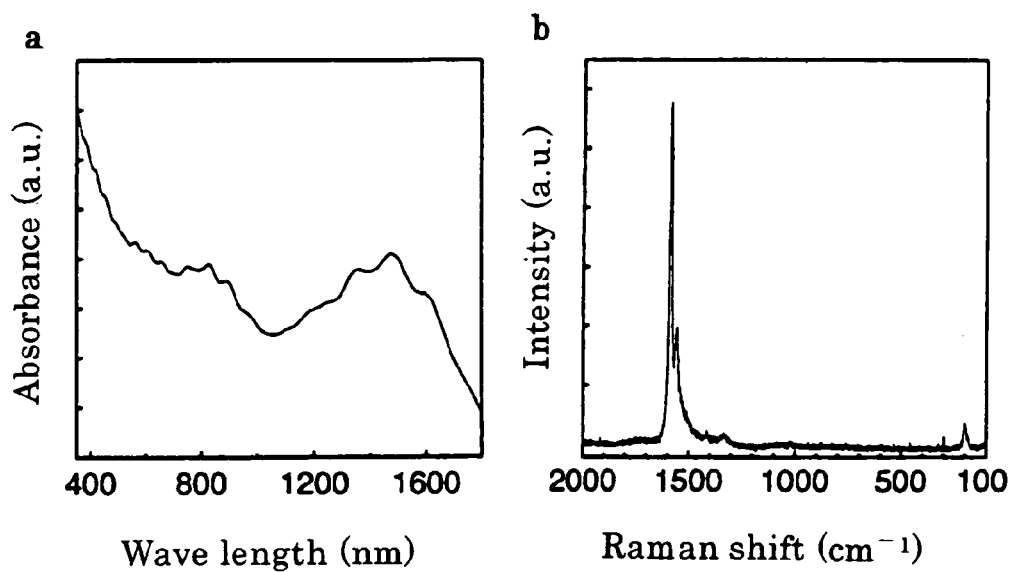
FIG. 3 shows an electron absorption spectrum (a) and a Raman spectrum (b) of a gel composition of the present invention.

FIG. 3a shows an electron absorption spectral measurement of the gel composition sandwiched between quartz plates. There are observed electron spectra, as conventionally reported with respect to the single-walled carbon nanotube (HiPco), i.e. the spectra at 730-1000 nm and 1100-1700 nm attributed to the semiconductive property of the nanotube as well as the spectra at 540-640 nm attributed to the metallic property of the nanotube. FIG. 3a shows a Raman spectrum of the gel composition (excitation wavelength: 488 nm). There is observed the Raman spectrum well known with respect to the carbon nanotube (HiPco): 1588 $cm^{-1}$ and 201 $cm^{-1}$. It can be seen from these results that the pulverization treatment under the shearing force will not cause any chemical change of the carbon nanotube but bring about only a physical conformational change thereof.

Figure 4:
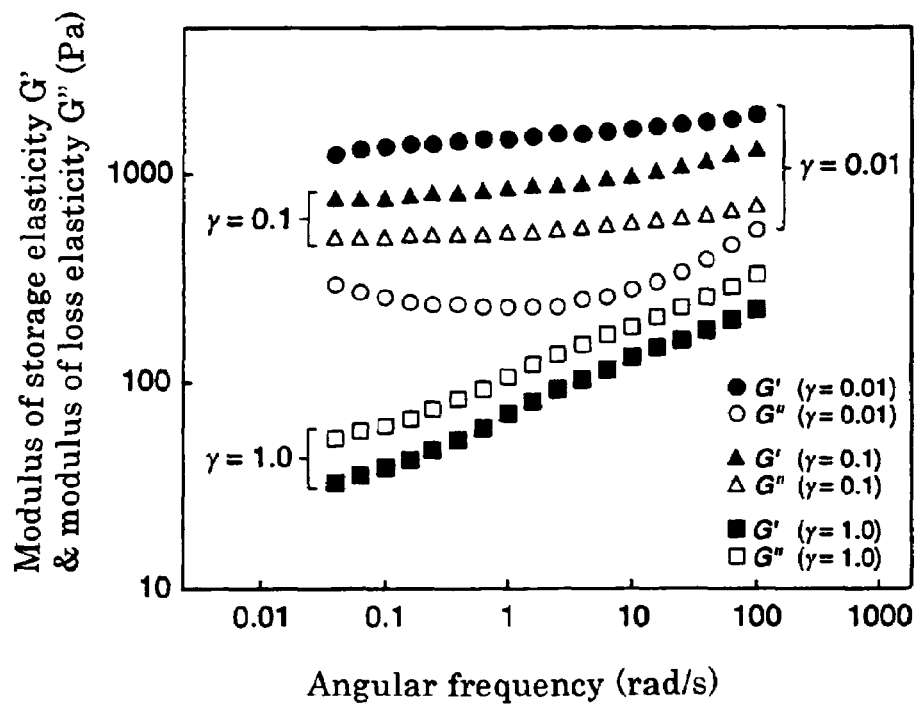
FIG. 4 shows the results of dynamic viscoelasticity measurement on a gel composition of the present invention.

(2) Dynamic Viscoelasticity Measurement:

Pulverization was carried out on carbon nanotube (HiPco) 15 mg and ionic liquid ($BMIBF_4$) 2.0 mL in an automatic mortar at room temperature for one hour, followed by centrifugal separation (9,100 g×one hour). The resultant gel composition was measured for dynamic viscoelasticity. The results are shown in FIG. 4.

There is observed a plateau region in G'(modulus of storage elasticity) in the case of a low strain applied ($\gamma$=0.01 or 0.1), suggesting the formation of an elastic network structure in the gel composition, whereas, in the case of a high strain applied ($\gamma$=1.0), G' and G" (modulus of loss elasticity) greatly change with the change of angular frequency, suggesting destruction of the gel. As shown in FIG. 4, even with a considerably low strain applied ($\gamma$<1.0), the modulus of storage elasticity G' depends upon the angular frequency. It is thus estimated that the network structure forming the gel is not due to a strong force such as the entanglement of the carbon nanotubes but is caused by relatively weak physical interactions.

(3) Thermal Analysis and X-Ray Diffraction (XRD) Measurement:

The gel composition as prepared in Example 1 containing 0.5% by weight of the carbon nanotube (HiPco) (the ionic liquid: $BMITf_2N$) was measured for differential scanning calorimetric (DSC) analysis and X-ray diffraction (XRD).

Figure 5:
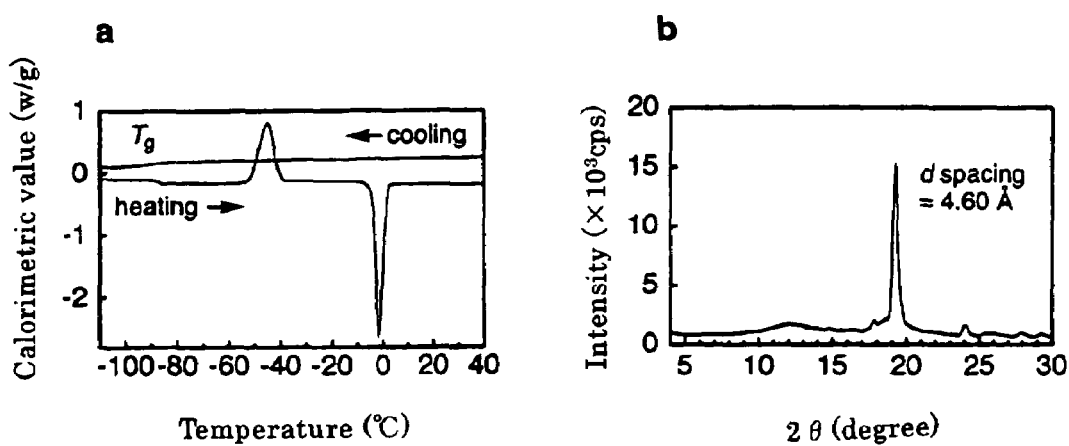
FIG. 5 shows the results of differential scanning calorimetry (DSC) and X-ray diffraction (XRD) carried out on a gel composition of the present invention.
Figure 6:
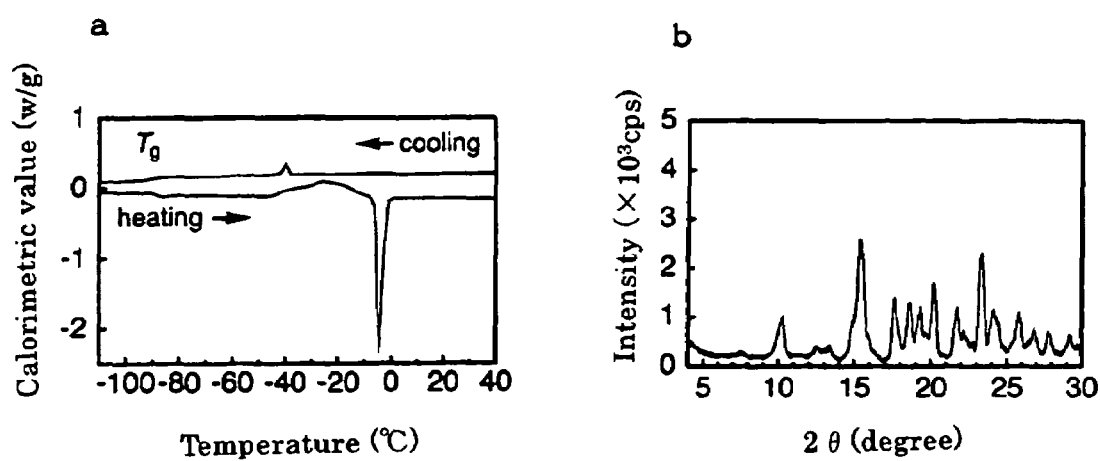
FIG. 6 shows the results of DSC and XRD carried out only on an ionic liquid, for purpose of comparison.

The results of the DSC analysis are shown in FIG. 5a. FIG. 5b shows the result of XRD measurement with respect to the intermediate region between the exothermal peak at −52° C. and the endothermal peak at −4° C. These results of the DSC analysis and the XRD measurement are completely different from the results of DSC analysis and XRD measurement singly for the ionic liquid $BMITf_2N$ (FIGS. 6a and 6b), which forms a polycrystalline structure at a low temperature. It is also confirmed that the carbon nanotube does not exhibit any X-ray diffraction. It is thus considered that the simple XRD pattern as given by FIG. 5b is due to a single mode of molecular arrangement of the ionic liquid over a wide region. The d value, 4.60 Å, as given by FIG. 5b is virtually in agreement with the interplanar spacing, 4.53 Å, in the formation of an imidazolium ionic pair as reported with respect to crystalline $EMIPF_6$.

It is estimated from the results as shown in the above (2) and (3) that the formation of gel in the gel composition of the present invention is caused by a three-dimensional network structure composed of carbon nanotubes combined with one another through ionic bonding due to ionic liquid molecules, wherein the ionic liquid molecules are arrangedly attached on the surfaces of the less entangled carbon nanotubes through the "cation-π" interaction.

Example 3

A gel composition was prepared in the same manner as in Example 1 except that, in place of the carbon nanotube (HiPco) as used in Example 1, there was used a carbon nanotube of a lower purity containing 20% by weight of the metal catalyst residue. The black gel composition obtained was composed of the ionic liquid and ca. 2.5% by weight of the carbon nanotube.

Example 4

A gel composition was prepared in the same manner as in Example 1 except that, in place of the carbon nanotube (HiPco) as used in Example 1, there was used a carbon nanotube of a lower purity produced by the laser process containing 30% by weight of graphite. The black gel composition obtained was composed of the ionic liquid and ca. 1.5% by weight of the carbon nanotube.

INDUSTRIAL UTILITY

As apparent from the foregoing description, there is obtained a gel composition composed of a carbon nanotube and an ionic liquid, by a simple process of pulverizing, in the presence of the ionic liquid, the carbon nanotube under a shearing force applied thereto. The gel composition obtained exhibits an excellent workability and thus it can be worked by a simple process of forming a desired shape by subjecting the composition in a fluidized state to application of an external force by a printing, coating, extrusion or injection operation, and then removing the ionic liquid with a solvent or an absorbent.

Therefore, the gel composition of the present invention has a wide range of expected applications, including new types of carbon nanotube-containing materials such as painting materials, printing materials, coating materials, molding materials, electronic device materials provided with semiconductor or metallic properties.

The invention claimed is:

1. A gel composition formed by a method which comprises pulverizing carbon nanotubes by applying a shearing force to a mixture consisting of carbon nanotubes and an ionic liquid, wherein the ionic liquid is a salt which assumes a molten state at or very near room temperature.

2. The gel composition as claimed in claim 1, wherein the carbon nanotubes are single-walled carbon nanotubes.

3. The gel composition as claimed in claim 1, the method by which it is formed further comprising a step of subjecting the product of the pulverization to centrifugal separation.

4. The gel composition as claimed in claim 1, wherein the gel composition is capable of assuming a fluid state when an external force is applied.

5. A method for producing the gel composition of claim 1 consisting of carbon nanotubes and an ionic liquid, which comprises a step of pulverizing, in the presence of the ionic liquid, the carbon nanotubes by applying a shearing force thereto.

6. The method for producing the gel composition as claimed in claim 5, further comprising a step of subjecting the product of the pulverization to centrifugal separation.

7. A method for using the gel composition of claim 1, which comprises the step of forming a desired shape from said gel composition by subjecting the composition in a fluidized state to application of an external force by a printing, coating, extrusion or injection operation, and then a step of removing the ionic liquid from said gel composition by bringing said shape in contact with a solvent capable of dissolving the ionic liquid or an absorbent capable of absorbing the ionic liquid.

* * * * *